(12) United States Patent
Enoki et al.

(10) Patent No.: US 6,895,008 B2
(45) Date of Patent: May 17, 2005

(54) LABEL SWITCHING ROUTER

(75) Inventors: Tohru Enoki, Fukuoka (JP); Yoshio Aoyagi, Fukuoka (JP); Yuji Oohara, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 766 days.

(21) Appl. No.: 09/818,352

(22) Filed: Mar. 27, 2001

(65) Prior Publication Data

US 2002/0057691 A1 May 16, 2002

(30) Foreign Application Priority Data

Nov. 15, 2000 (JP) ........................................ 2000-348004

(51) Int. Cl.[7] .............................................. H04L 12/56
(52) U.S. Cl. ..................................... 370/392; 370/389
(58) Field of Search .............................. 370/216–217, 370/227–228, 238, 244, 338, 351–352, 389, 392, 395.1–398, 400–401, 410, 419, 466, 522

(56) References Cited

U.S. PATENT DOCUMENTS

| | | | |
|---|---|---|---|
| 6,680,943 B1 * | 1/2004 | Gibson et al. ............... | 370/392 |
| 2001/0019554 A1 * | 9/2001 | Nomura et al. ............. | 370/389 |
| 2002/0156914 A1 * | 10/2002 | Lo et al. ...................... | 709/238 |
| 2003/0065815 A1 * | 4/2003 | Klink .......................... | 709/239 |

FOREIGN PATENT DOCUMENTS

| | | |
|---|---|---|
| JP | 03044140 | 2/1991 |
| JP | 11-150634 | 5/1999 |

* cited by examiner

*Primary Examiner*—Wellington Ching
*Assistant Examiner*—John Shew
(74) *Attorney, Agent, or Firm*—Katten Muchin Zavis Rosenman

(57) ABSTRACT

In a label switching router placed at one end of an LSP set by using CRLDP, a bidirectional LSP setup TLV preparing portion prepares a bidirectional LSP setup TLV included in a bidirectional setup label request message transmitted in an up direction to a label switching router placed at the other end of the LSP. Based on an external bidirectional LSP setup request accepted by a bidirectional LSP setup accepting portion, a bidirectional LSP setup TLV analyzer analyzes the bidirectional LSP setup TLV in the message. When the message is received from the label switching router at the other end, a bidirectional LSP processor performs an LSP setup request in a down direction as opposed to the up direction. Based on the analyzed result by the bidirectional LSP setup TLV analyzer, and an explicit route preparing portion prepares an explicit route on which a router to be relayed in the down direction is prescribed. Based on an explicit route preparing request from the bidirectional LSP processor, explicit route preparing portion notifies the prepared route to the bidirectional LSP processor.

7 Claims, 19 Drawing Sheets

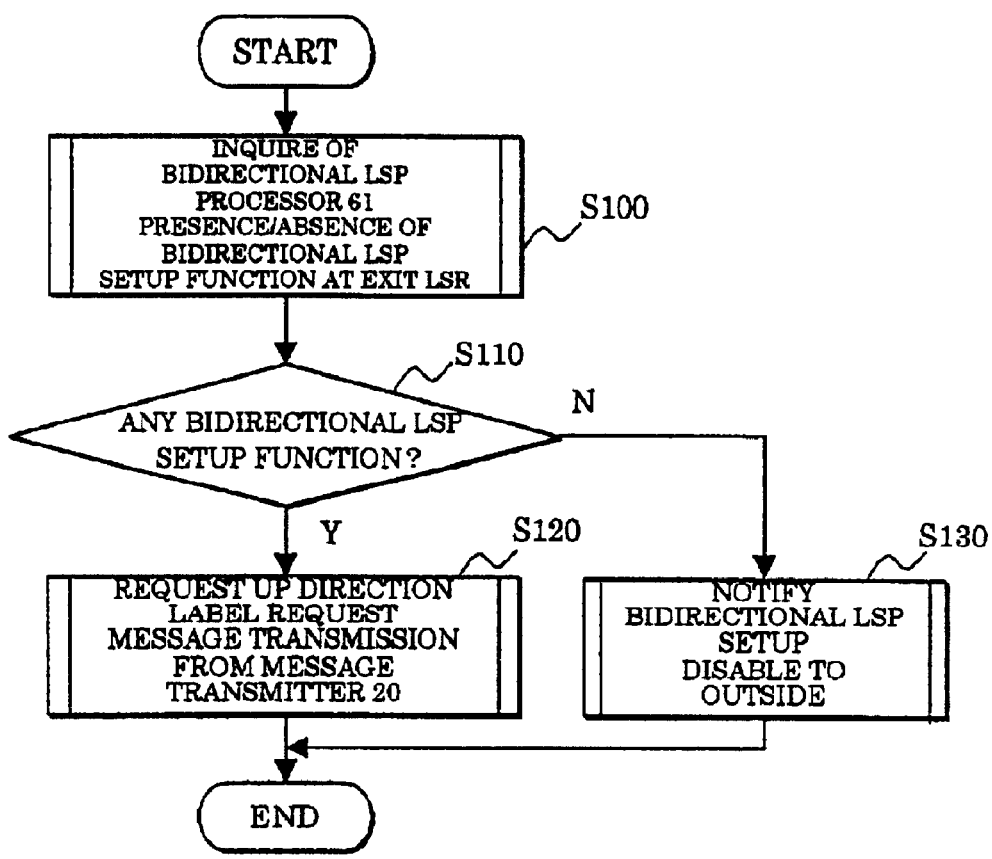

FIG.9

```
 0                   1                   2
 0 1 2 3 4 5 6 7 8 9 0 1 2 3 4 5 6 7 8 9 0 1 2 3 4 5 6 7 8 9 0 1
|U|F|    TYPE (0x3E02)    |           LENGTH              |
|              VENDOR ID                                  |
```

FIG.10

```
 0                   1                   2                   3
 0 1 2 3 4 5 6 7 8 9 0 1 2 3 4 5 6 7 8 9 0 1 2 3 4 5 6 7 8 9 0 1
|0|0|  PATH VECTOR(0x0104) |           LENGTH              |
|                      LSR ID 1                           |
|                         ~                               |
|                      LSR ID n                           |
```

VALUE

FIG.11

| UP DIRECTION LSP ID | DOWN DIRECTION LSP ID |
|---|---|
| 1 | 2 |

LABEL SWITCHING ROUTER

BACKGROUND OF THE INVENTION

1. Field of the Invention

The present invention relates to a Label Switching Router (hereinafter abbreviated as LSR), and in particular to a label switching router placed at an end of an LSP (Label Switched Path).

2. Description of the Related Art

FIG. 28 shows a state in which a prior art router performs a packet transfer process by a software processing in the layer 3 by referring to a destination address. An IP packet P1 transmitted from an entrance router 1 reaches an exit router 3 through a middle router 2.

On the other hand, FIG. 29 shows a packet transfer process by LSR's 1–3 which are routers used for MPLS (Multi Protocol Label Switching). The MPLS allocates 20 bits label to an IP communication traffic designated by an FEC (Forwarding Equivalence Class), thereby enabling switching by a hardware processing by a fixed length label (Shim header) in the layer 2.5. The MPLS is a technology for transferring a packet at a high speed.

As shown in FIG. 29, a label "a" is attached to an IP packet P1 at an entrance LSR 1, so that the IP packet P1 is transmitted to a middle LSR 2. At the middle LSR 2, the label "a" of the IP packet P1 is replaced with a label "b", so that the IP packet P1 is transmitted to an exit LSR 3. In this case, the label "a" assumes an incoming label, and the label "b" assumes an outgoing label at the middle LSR 2. At the exit LSR 3, the label "b" is deleted, thereby obtaining the original IP packet P1.

Also, FIG. 30 shows an arrangement of a general LSR, in which an LSR 100 is composed of line interfaces 101 and 106, a CPU 102, a switch 103, an LSI 104 for retrieval, a memory 105, and a memory 107 for a retrieval table. The LSR's 1–3 in FIG. 29 have the same arrangement.

The CPU 102 in the LSR 100 realizes an MPLS function by using various data held in the memory 105.

In operation, the frame (e.g. label "a" is attached as incoming label) received from the line through the line interface 101 is sent to the switch 103. The switch 103 inquires of the retrieving LSI 104 the outgoing label corresponding to the incoming label. The retrieving LSI 104 determines the outgoing label (e.g. label "b") referring to the retrieval table set by the CPU 102 and held in the memory 107 for the retrieval table.

The switch 103 transmits the frame, to which the label "b" notified from the retrieving LSI 104 is attached as an outgoing label, to the line through the line interface 106.

It is necessary that the correspondence between the incoming label and the outgoing label is preset and the LSP is set up (established) in order that the LSR performs the above-mentioned operation. Such an LSP setup process will now be described referring to FIG. 31.

In FIG. 31, the LSR 100 connected to a communication line 70 is composed of an MPLS processor 60, a label manager 50, and a switch setting portion 40. An LSP setup accepting portion 10, a message transmitter 20, and a message receiver 30 are provided in the MPLS processor 60.

It is assumed that an LSR 200 whose arrangement is the same as that of the LSR 100 is connected to the end of the communication line 70, and the LSP is to be set up between the LSR's 100 and 200.

When accepting an external LSP setup request S1 at the LSP setup accepting portion 10, the MPLS processor 60 of the LSR 100 performs a label request message transmission S3 to the communication line 70 from the message transmitter 20 by instructions S2 of the LSP setup accepting portion 10.

At the LSR 200 on the message reception side, its own message receiver 30 performs a label request message reception S4 from the communication line 70. The MPLS processor 60 performs a label request S5 from the label manager 50, and receives a notification S5 of a label to be allocated by the label manager 50. The label is notified to the LSR 100 which is the source of the label request message by a label mapping message at the message transmitter 20.

At the source LSR 100 which has received the label notification in the label mapping message, the MPLS processor 60 performs a label setting S6 to the switch setting portion 40.

The MPLS automatically establishes a best effort type LSP by cooperating with the existing routing protocol. The LSP is a unidirectional path, so that two independent LSP's are required to perform a bidirectional communication.

However, in the prior art MPLS, only a single unidirectional LSP can be set with a single operation. Therefore, in order to perform the bidirectional communication between the apparatuses, it is necessary for a management person to perform the LSP setup at two LSP's which assume the entrances of each LSP respectively, or for an external database server which grasps the entire network to request the LSP setup from the two LSR's which assume the entrances of each LSP, resulting in problems as follows:

(1) In case the LSP setup operation is performed at the two LSR's which assume the entrances, it is necessary to perform an up direction LSP setup and a down direction LSP setup respectively. Since it takes time to establish a bidirectional LSP, a real-time operation can not be performed.

(2) In case the external database server is used, a database amount swells in proportion to the network scale, so that a memory amount and the load of the server increase. Since it is required that information is notified from each LSR to the server, the load of the network also increases. Furthermore, it takes more time to prepare the database as the network scale becomes larger, so that a real-time operation for starting the bidirectional communication is missed.

As a solution for such problems, a bidirectional LSP setup method has been proposed in the "packet relaying apparatus" of the Japanese Patent Application Laid-open No.11-150634 (hereinafter, referred to as a PAA apparatus) by the applicant of the present invention.

This method is characterized in that an available range and a directionality (direction) of a label are determined by a negotiation with an adjoining packet relaying apparatus, a label distribution protocol processor for allocating the label to a forwarding equivalence class treats a unidirectional forwarding equivalence class and another forwarding equivalence class opposite in direction to the former forwarding equivalence class as a single bidirectional forwarding equivalence class, and allocates the label to the bidirectional forwarding equivalence class.

FIG. 32 shows a simultaneous allocation example of the same label between ATM-LSR_A and ATM-LSR_B which are adjoining LSR's in the PAA apparatus (partially omitted).

Firstly, the ATM-LSR_A includes information indicating that a symmetrical FEC can be simultaneously allocated in a label request message S31 transmitted to the ATM-LSR_B. The ATM-LSR_B includes a label allocated to the ATM-LSR_A and information indicating that the simultaneous allocation of the symmetrical FEC has been performed in a label mapping message S32 transmitted to the ATM-LSR_A.

Thus, it becomes possible to set up a pair of bidirectional LSP's with a single operation by the ATM-LSR_A.

However, since the PAA apparatus is characterized by the label allocation method of the adjoining packet relaying apparatuses, it is necessary for all of the LSR's existing on the route of the LSP to be provided with such a label allocation function.

On the other hand, apart from the above-mentioned problems (1) and (2), the necessity of a quality of service guarantee (hereinafter, occasionally abbreviated as QoS guarantee) in the IP communication network has been rapidly increasing recently by the appearance of VOIP (Voice Over IP) and RTP (Real-time Transport Protocol).

As a technology for providing the QoS guarantee for the MPLS, CRLDP (Constraint-based Routing Label Distribution Protocol) which is the label distribution protocol treating a constraint route is known. It is possible to designate the QoS guarantee and the LSP path and to statically set the LSP with the CRLDP.

The designation of the QoS guarantee and the LSP path (explicit route) in the CRLDP is realized by setting a traffic parameters TLV and an explicit route parameters TLV in the label request message transmitted when the label switching router placed at one end of the LSP requests the LSP setup from the label switching router at the other end.

Although the necessity of the bidirectional communication having the QoS guarantee is further increasing in the MPLS according to the development of the Internet and the arrangement of the social infrastructure, the solution of the QoS guarantee issue has been attempted by using the CRLDP.

In the present IP communication network, the communication between the server and the client such as a VOIP communication, a file transfer, and the Web browsing occupies the most part of the IP traffic, so that in such a communication the bidirectional communication is always required.

However, in order to apply the PAA apparatus for the matter of the bidirectional communication, it is necessary that all of the relaying apparatuses within the network are replaced with ones having the function of the PAA apparatus, so that the introducing cost steeply rises especially in case of a large-scale network.

SUMMARY OF THE INVENTION

It is accordingly an object of the present invention to provide a label switching router placed at an end of an LSP set by using CRLDP which automatically establishes a pair of bidirectional LSP's by making use of an existing network with a single operation.

In order to achieve the above-mentioned object, a label switching router according to the present invention comprises: a bidirectional LSP setup accepting portion for accepting an external bidirectional LSP setup request, a bidirectional LSP setup TLV preparing portion for preparing a bidirectional LSP setup TLV included in a bidirectional setup label request message transmitted in an up direction to a label switching router placed at another end of the LSP based on the bidirectional LSP setup request, a bidirectional LSP setup TLV analyzer for analyzing the bidirectional LSP setup TLV in the message when the message is received from the label switching router at the other end, a bidirectional LSP processor for performing an LSP setup request in a down direction as opposed to the up direction based on the analyzed result by the bidirectional LSP setup TLV analyzer, and an explicit route preparing portion for preparing an explicit route on which a router to be relayed in the down direction is prescribed, based on an explicit route preparing request from the bidirectional LSP processor, based on the CRLDP, and for notifying the prepared route to the bidirectional LSP processor.

FIG. 1 shows a label switching router 100 placed at an end of an LSP (not shown) as a schematic arrangement of the present invention according to claim 1. According to the present invention, in addition to the arrangement of the prior art label switching router 100 shown in FIG. 31, a bidirectional LSP setup accepting portion 11, a bidirectional LSP setup TLV (Type Length Value) preparing portion 21, a bidirectional LSP setup TLV analyzer 31, a bidirectional LSP processor 61, and an explicit route preparing portion 62 are provided in the MPLS processor 60, as shown by double blocks.

Namely, in the present invention according to claim 1, the bidirectional LSP setup accepting portion 11 at the LSR 100 accepts an external bidirectional LSP setup request S1, and the bidirectional LSP setup TLV preparing portion 21 prepares, based on the bidirectional LSP setup request, a bidirectional LSP setup TLV to be included in a bidirectional setup label request message transmitted in an up direction to an LSR 200 placed at the other end of the LSP.

Also, when receiving the bidirectional LSP setup label request message transmitted by the LSR 100 at the other end, the bidirectional LSP setup TLV analyzer 31 at the LSR 200 analyzes the bidirectional LSP setup TLV in the message, so that the bidirectional LSP processor 61 makes the LSP setup request in the down direction as opposed to the up direction based on the analyzed result by the bidirectional LSP setup TLV analyzer 31.

It is to be noted that in the CRLDP, it is necessary to prescribe the routers which the label request message should relay as an "explicit route", and generally the explicit route in the up direction is provided by the external bidirectional LSP setup request S1. Also, it is necessary to prescribe the explicit route in the down direction upon the LSP setup request in the down direction.

Therefore, the bidirectional LSP processor 61 requests the preparation of the explicit route which prescribes the routers to be relayed by the label request message in the down direction from the explicit route preparing portion 62, which notifies the explicit route prepared based on the preparation request to the bidirectional LSP processor 61.

Thus, the bidirectional LSP processor 61 can prescribe the explicit route in the down direction upon the LSP setup request in the down direction.

The LSR 100 establishes the up direction LSP by receiving the label mapping message from the LSR 200 in the same way as the prior art. Also, the LSR 100 transmits the label mapping message, in the same way as the prior art, to the label request massage in the down direction received from the LSR 200, so that the LSR 200 which has received the label mapping message establishes the down direction LSP.

Thus, it becomes possible to automatically establish the bidirectional LSP of LSR 100→LSR 200 and LSR 200→LSR 100 with a single operation by the LSR 100 placed at one end of the LSP.

In this way, the up direction LSP is set by the same process as the prior art LSP setup with the label request message and the label mapping message. Also, the LSR 200 placed at the other end of the up direction LSP determines that the bidirectional LSP setup is necessary by the bidirectional LSP setup TLV analyzer 31, and automatically transmits the label request message to the down direction, so that the down direction LSP is set in the same way as the prior art LSP setup.

In the LSP set by using the CRLDP, all of the label switching routers including the ones at the both ends of the LSP use the CRLDP. The LSP setup process by the above-mentioned label request message and the label mapping message is a basic process in the CRLDP.

Accordingly, the other label switching routers existing on the LSP path do not need to have a special function except the use of the CRLDP.

Also, in the label switching router according to the present invention, the bidirectional LSP setup TLV preparing portion may include down direction service quality information in the bidirectional LSP setup TLV.

Namely, the bidirectional LSP setup TLV preparing portion 21 in FIG. 1 prepares the bidirectional LSP setup TLV including down direction service quality information.

Thus, it is possible to designate the service quality of the down direction LSP from the LSR 100 at the side of requesting the up direction LSP setup. When the communication traffic amount to the up direction is different from that to the down direction such as in a file transfer and an image distribution, it becomes possible to designate the service qualities respectively suitable for the up direction LSP and the down direction LSP.

Also, in the label switching router according to the present invention, the bidirectional LSP setup TLV preparing portion may include down direction explicit route information in the bidirectional LSP setup TLV.

Namely, the bidirectional LSP setup TLV preparing portion 21 in FIG. 1 prepares the bidirectional LSP setup TLV including down direction explicit route information.

Thus, it becomes possible to designate, from the LSR 100 at the side of requesting the up direction LSP setup, the explicit route which the down direction LSP should pass through.

Also, in the label switching router according to the present invention, the bidirectional LSP setup TLV preparing portion may set bidirectional LSP setup information in the label request message transmitted upon an LSP information change request in the up direction.

Namely, in case of changing the existing LSP setup, the bidirectional LSP setup TLV preparing portion 21 in FIG. 1 sets bidirectional LSP setup information in the label request message transmitted upon the LSP information change request in the up direction.

Thus, with the setup change of the up direction LSP, the setup change of the down direction LSP can be automatically performed with a single operation by the LSR 100 placed at one end of the LSP.

Also, in the label switching router according to the present invention, the bidirectional LSP setup TLV preparing portion may set bidirectional LSP deletion information in a label release message transmitted upon an LSP deletion request in the up direction.

Namely, when releasing the existing LSP, the bidirectional LSP setup TLV preparing portion 21 in FIG. 1 sets the bidirectional LSP deletion information in the label release message transmitted upon the LSP deletion request in the up direction.

Thus, with the release of the up direction LSP, the down direction LSP release can be performed with a single operation by the LSR 100 placed at one end of the LSP.

It is to be noted that when the bidirectional LSP setup TLV analyzer finds, as a result of analyzing a label mapping message received in response to the label request message, that bidirectional LSP request accepting information indicating that the bidirectional LSP setup request is accepted at the label switching router placed at the other end is not set in the label mapping message, the bidirectional LSP processor may recognize that the label switching router at the other end does not have a bidirectional LSP setup function.

Namely, when receiving the label mapping message in response to the label request message, the LSR 100 analyzes the label mapping message at the bidirectional LSP setup TLV analyzer 31. When the bidirectional LSP request accepting information indicating that the bidirectional LSP setup request is accepted at the label switching router placed at the other end is not set in the label mapping message, the bidirectional LSP processor 61 recognizes that the LSR 200 at the other end does not have the bidirectional LSP setup function.

Thus, the repetition of the bidirectional LSP setup request to the LSR 200 which does not have the bidirectional LSP setup function can be avoided, so that it becomes possible to reduce the useless process.

Also, the above-mentioned bidirectional LSP setup TLV may comprise a vendor-private TLV.

BRIEF DESCRIPTION OF THE DRAWINGS

FIG. 3 is a flow chart showing a process flow (upon external request of bidirectional LSP setup) of a bidirectional LSP setup accepting portion 11 in an embodiment (1) of a label switching router according to the present invention;

FIG. 4 is a table showing a listed example of LSR's without a bidirectional LSP setup function in an embodiment (1) of a label switching router according to the present invention;

FIG. 9 is a diagram showing a format (setup acceptance) of a vendor-private TLV in an embodiment (1) of a label switching router according to the present invention;

FIG. 10 is a diagram showing a format of a path vector TLV in an embodiment (1) of a label switching router according to the present invention;

FIG. 11 is a diagram showing an example of an LSP ID correspondence table in an embodiment (1) of a label switching router according to the present invention;

Throughout the figures, like reference numerals indicate like or corresponding components.

DESCRIPTION OF THE EMBODIMENTS

Figure 1:
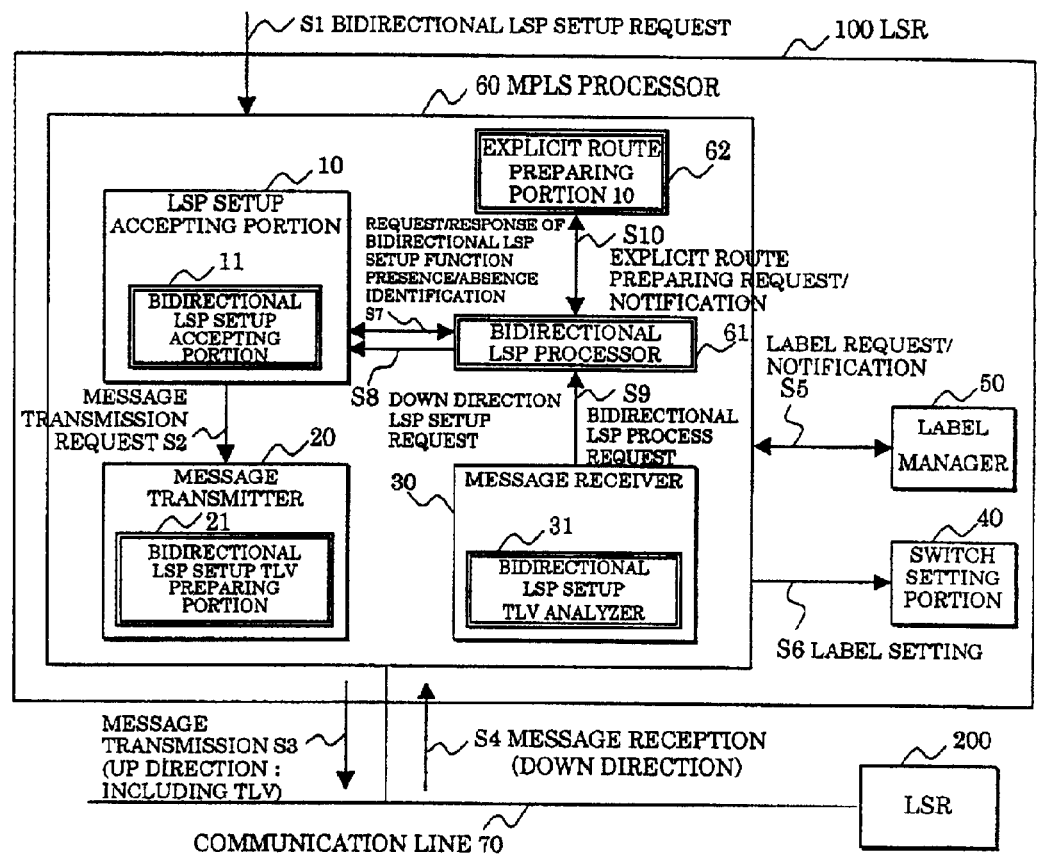
FIG. 1 is a block diagram showing a schematic arrangement of a label switching router according to the present invention.

Hereinafter, embodiments (1)–(6) of a label switching router according to the present invention will be described by referring to FIGS. 2–27. It is to be noted that common to each embodiment, the reference numerals in FIG. 1 are referred on the assumption that LSR's placed at both ends of an LSP to be set up (established) have the same arrangement as that of the LSR 100 shown in FIG. 1.

Also, since CRLDP is used in the embodiments (1)–(6), each LSR is assumed to perform a general process, unless particularly mentioned.

Namely, for common matters to the following description, the information of the QoS guarantee and the explicit route is assumed to be set, as usual, according to the external request, in the traffic parameters TLV and the explicit route parameters TLV within the up direction label request message.

Thus, the up direction LSP, as performed so far, has the QoS guarantee and the LSP path according to the external request.

Embodiment (1)

Embodiment (1) is one for establishing the bidirectional LSP with a single LSP setup request of the label switching router placed at one end of the LSP.

Figure 2:
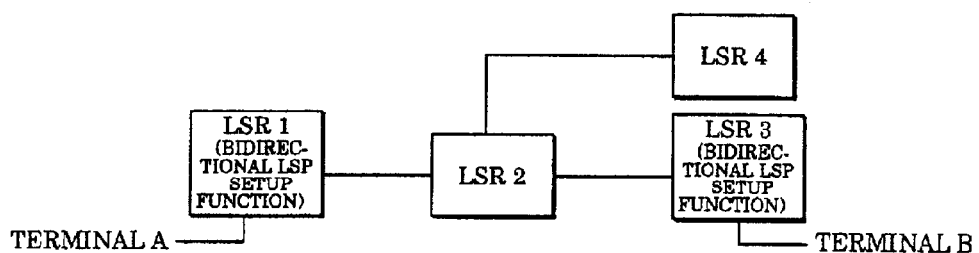
FIG. 2 is a diagram showing a network arrangement for describing an embodiment (1) of a label switching router according to the present invention.

FIG. 2 shows a network arrangement (1) for illustrating the embodiment (1), in which terminals "A" and "B" are respectively connected to LSR's 1 and 3. LSR's 1–4 are assumed to be connected as shown in FIG. 2, and to compose a network.

Also, the LSR's 1 and 3 are respectively assumed to correspond to the LSR's 100 and 200 of FIG. 1, and to have a bidirectional LSP setup function.

When an external request S1 for bidirectional LSP setup between the terminals "A" and "B" is made to the LSR 1, the bidirectional LSP setup accepting portion 11 in the LSP setup accepting portion 10 at the LSR 1 accepts the request S1.

FIG. 3 shows a process flow of the bidirectional LSP setup accepting portion 11 at that time. Firstly, the bidirectional LSP setup accepting portion 11 inquires of the bidirectional LSP processor 61 the presence/absence of the bidirectional LSP setup function at the LSR 3 (at step S100).

The bidirectional LSP processor 61 retrieves the LSR 3 from a table for LSR without bidirectional LSP setup function shown in FIG. 4. Since the LSR 3 is not included in the table, the bidirectional LSP processor 61 notifies that the LSR 3 has the bidirectional LSP setup function to the bidirectional LSP setup accepting portion 11.

It is to be noted that the operation of registering in the table for LSR without bidirectional LSP setup function will be described in the embodiment (6).

Then, the bidirectional LSP setup accepting portion 11 recognizes that the LSR 3 has the bidirectional LSP setup function based on the notification from the bidirectional LSP processor 61 (at step S110), and requests the message transmitter 20 to transmit the up direction label request message (at step S120).

It is to be noted that in case the LSR 3 does not have the bidirectional LSP setup function, the bidirectional LSP setup accepting portion 11 transmits the bidirectional LSP setup disabling notification to the outside (at step S130).

The process operation of the message transmitter 20 which has received the transmission request of the up direction label request message from the bidirectional LSP setup accepting portion 11 will now be described by referring to FIG. 5.

The message transmitter 20 requests the preparation of the vendor-private TLV which should be included in the label request message for performing the bidirectional LSP setup, from the built-in bidirectional LSP setup TLV preparing portion 21 (at step S200), and transmits the up direction label request message including the prepared vendor-private TLV (at step S210).

Figure 6:
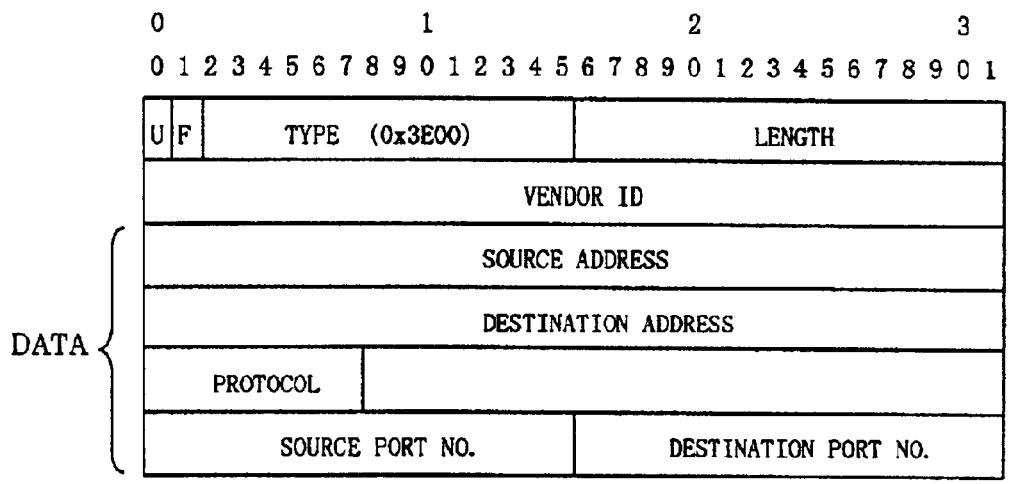
FIG. 6 is a diagram showing a format (bidirectional setup) of a vendor-private TLV in an embodiment (1) of a label switching router according to the present invention.

FIG. 6 shows a format of the vendor-private TLV including the bidirectional setup information. The vendor-private TLV is composed of a "U" bit, an "F" bit, a type, a length, a vender ID, and data. In the vendor-private TLV used in the present invention, the values of the "U" bit and "F" bit are fixed to "1", in order that the relaying LSR can relay the vendor-private TLV to the exit LSR without discarding the vendor-private TLV.

The values of the type available as the vendor-private TLV are 0x3E00-0x3EFF, and the value "0x3E00" is set as the value indicating the bidirectional setup in the embodiment (1).

Also, in the length, the total of the vendor ID and the data field is displayed by the octet. Flow information composed of a source IP address, a destination IP address, a protocol, a source port No., and a destination port No., and the later described traffic parameters TLV or the explicit route parameters TLV are set in the data field if necessary.

It is to be noted that in the embodiment (1), the designation of the service quality and the explicit route in the down direction is not performed, and the traffic parameters TLV and the explicit route parameters TLV are not included in the data field in FIG. 6.

The label request message transmitted from the LSR 1 is received by the LSR 3 through the LSR 2.

Figure 7:
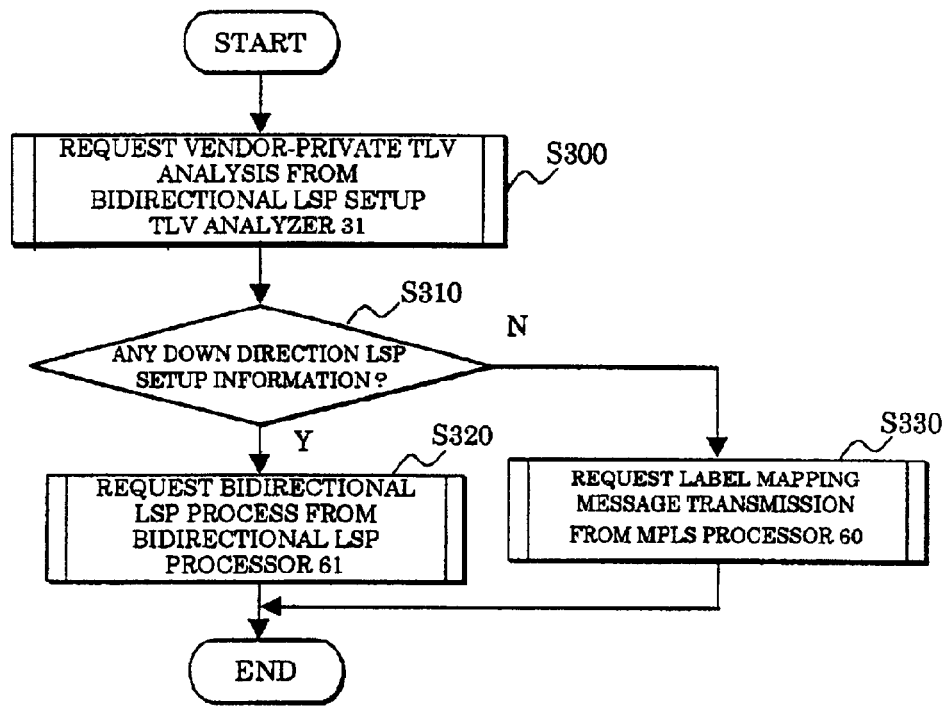
FIG. 7 is a flow chart showing a process flow (upon reception of up direction label request message) of a message receiver 30 in an embodiment (1) of a label switching router according to the present invention.

FIG. 7 shows a process flow of the message receiver 30 upon the label request message reception at the LSR 3.

The message receiver 30 requests the built-in bidirectional LSP setup TLV analyzer 31 to analyze whether or not there is down direction LSP setup information in the vendor-private TLV within the received label request message (at step S300).

The message receiver 30 receives the analyzed result by the bidirectional LSP setup TLV analyzer 31 to determine the presence/absence of the down direction LSP setup information (at step S310).

In the absence of the down direction LSP setup information (in case of not bidirectional LSP setup request), the message receiver 30 requests the MPLS processor 60 to transmit the label mapping message (at step S330). The MPLS processor 60, by the same process as the prior art, requests the label allocation from the label manager 50. When receiving the notification indicating that the allocation has completed, the MPLS processor 60 transmits the label mapping message to the LSR 1 after requiring the label setting from the switch setting portion 40.

In the presence of the down direction LSP setup information, the message receiver 30 makes the bidirectional LSP process request to the bidirectional LSP processor 61 (at step S320).

Figure 8:
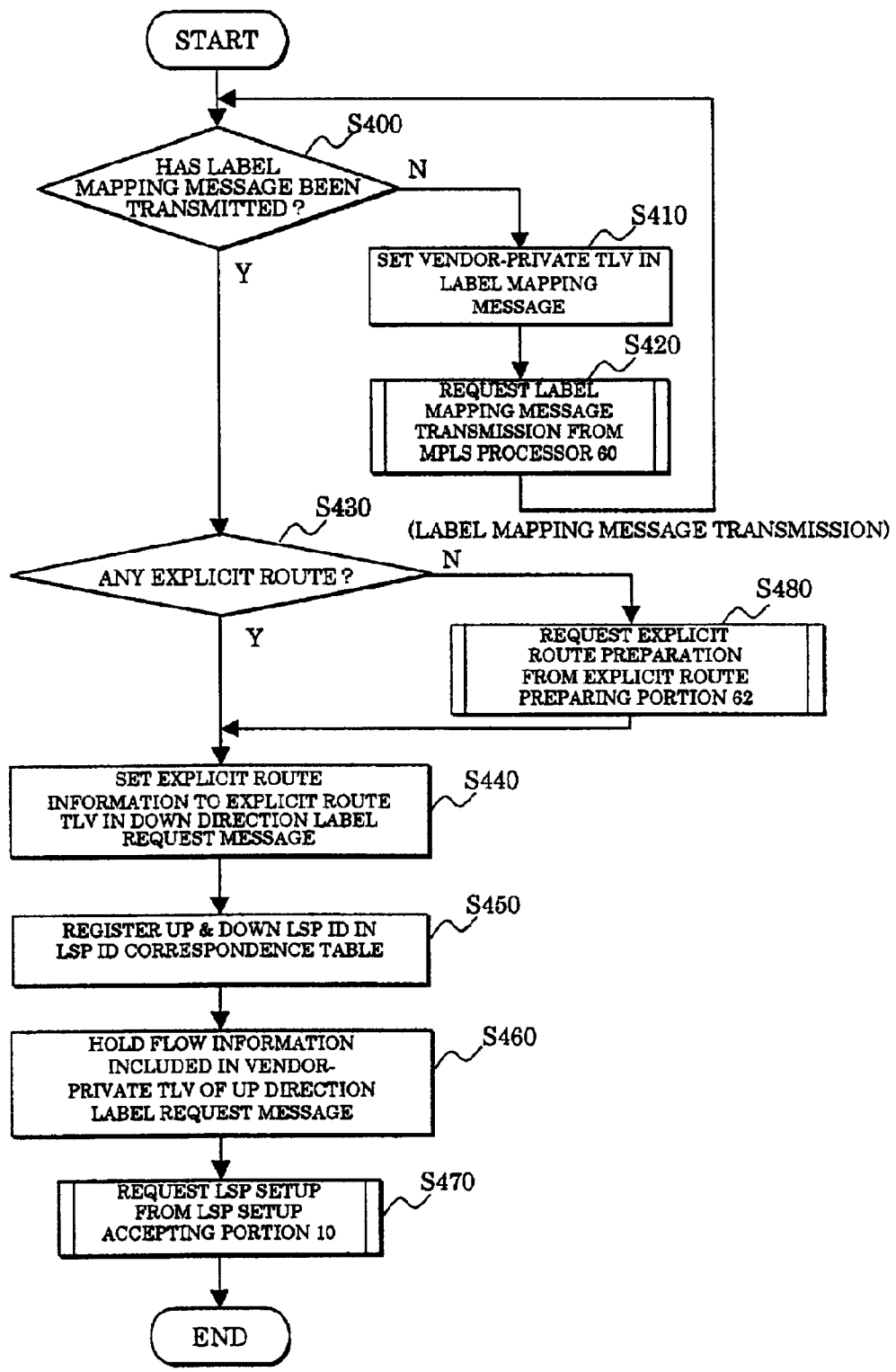
FIG. 8 is a flow chart showing a process flow (upon request of bidirectional LSP process) of a bidirectional LSP processor 61 in an embodiment (1) of a label switching router according to the present invention.

FIG. 8 shows a process flow of the bidirectional LSP processor 61. The bidirectional LSP processor 61 firstly determines whether or not the label mapping message has already been transmitted (at step S400).

In case the label mapping message has not been transmitted, the bidirectional LSP processor 61 sets the setup accepting information indicating that the bidirectional LSP setup request has been accepted, in the vendor-private TLV which should be included in the label mapping message transmitted to the LSR 1 (at step S410), and then requests the MPLS processor 60 to transmit the label mapping message (at step S420). The MPLS processor 60 which has received the request transmits the label mapping message to the LSR 1 in the same way as the prior art process.

FIG. 9 shows a format of the vendor-private TLV to which the type "0x3E02" indicating the setup accepting is set. It is to be noted that the data field is not set in this vendor-private TLV.

When the label mapping massage has already been transmitted, the bidirectional LSP processor 61 determines whether or not the explicit route information exists in the vendor-private TLV within the up direction label request message (at step S430).

Since no explicit route exists in case of the embodiment (1), the bidirectional LSP processor 61 requests the preparation of the explicit route from the explicit route preparing portion 62 (at step S480). In this case, the explicit route preparing portion 62 prepares the explicit route based on the path vector TLV information within the up direction label request message, and notifies the preparation completed notification to the bidirectional LSP processor 61.

Thus, the bidirectional LSP processor 61 sets the down direction explicit route in the explicit route TLV within the down direction label request message (at step S440).

It is to be noted that FIG. 10 shows a format of the path vector TLV, in which the type "0x0104" indicating the path vector and the ID values of the LSR's relayed in the up direction are set.

Then, the bidirectional LSP processor 61 stores the correspondence between the LSP ID, e.g. "1" for identifying the LSP within the up direction label request message and the LSP ID, e.g. "2" within the label request message transmitted to the down direction, so that the correspondence is added to an LSP ID correspondence table as shown in FIG. 11 (at step S450).

Furthermore, the bidirectional LSP processor 61 reads the source IP address, the destination IP address, the protocol No., the source port No., and the destination port No. included in the vendor-private TLV within the received label request message as flow information to be held (at step S460).

Then, the bidirectional LSP processor 61 requests the LSP setup from the LSP setup accepting portion 10 (at step S470).

Then, by the message transmission request from the LSP setup accepting portion 10, the message transmitter 20 transmits the down direction label request message. When receiving the label mapping message from the LSR 1, the LSR 3 establishes the down direction LSP designated by the LSR 1. The LSR 3 sets the flow information held therein to the established down direction LSP.

The reason for setting the flow information is because the establishment of the LSP only means that a tunnel is built but what kind of flow should be allocated to the established LSP is necessary.

Thus, it becomes possible to establish the bidirectional LSP with a single LSP setup request by the LSR 1.

Embodiment (2)

Embodiment (2) is one for designating the down direction QoS at the entrance LSR.

Figure 12:
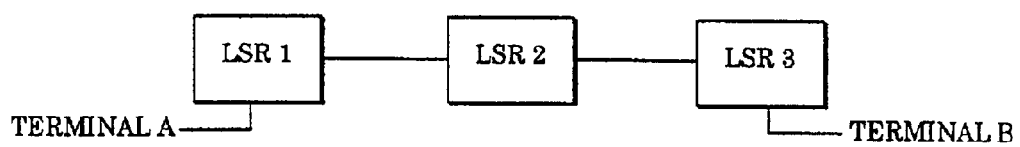
FIG. 12 is a diagram showing a network arrangement for describing an embodiment (2) of a label switching router according to the present invention.

FIG. 12 is a network arrangement (2) for describing the embodiment (2), in which the LSR's 1 and 3 have the bidirectional LSP setup function of the present invention.

Figure 5:
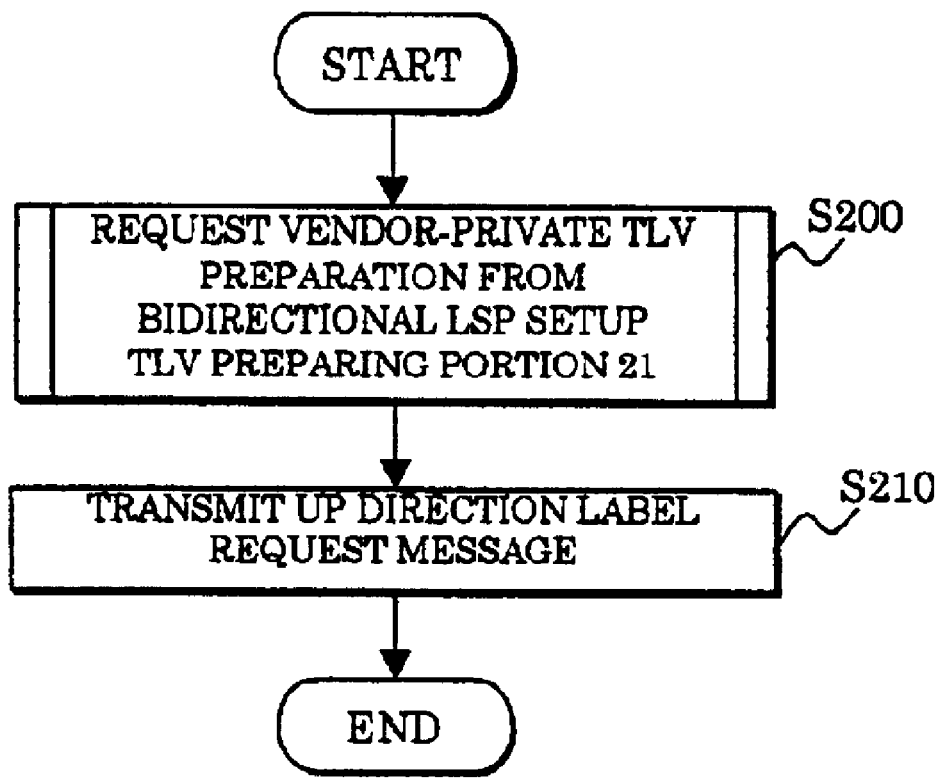
FIG. 5 is a flow chart showing a process flow (upon transmission request of up direction label request message) of a message transmitter 20 in an embodiment (1) of a label switching router according to the present invention.

As for the LSR 1, in case an external request for bidirectional LSP setup with the QoS designation between the terminals "A" and "B" is made, the processes of the bidirectional LSP setup accepting portion 11 in the LSP setup accepting portion 10 and the message transmitter 20 at the LSR 1 are executed in the same way as those in the embodiment (1) shown in FIGS. 3 and 5.

Figure 13:
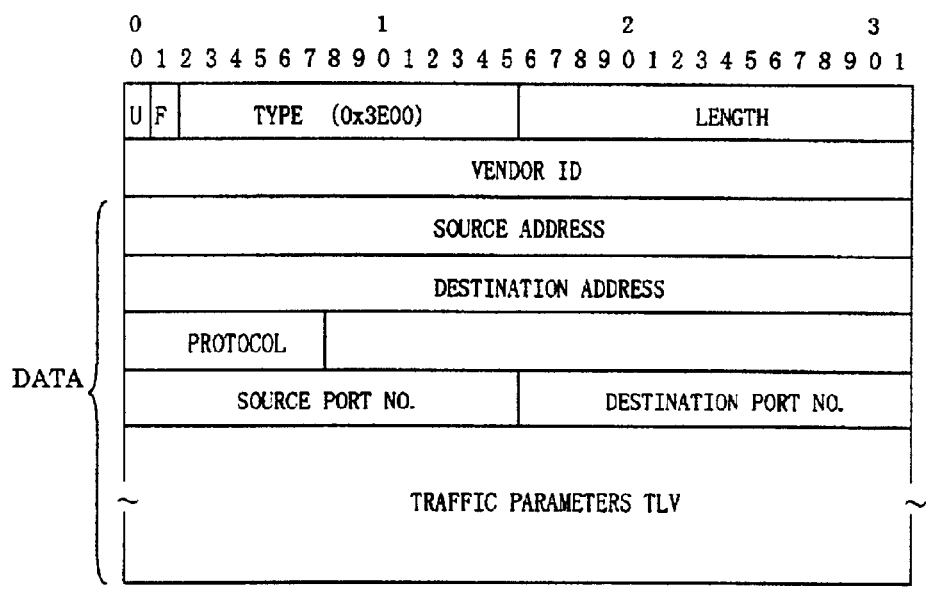
FIG. 13 is a diagram showing a format (bidirectional setup with QoS designation) of a vendor-private TLV in an embodiment (2) of a label switching router according to the present invention.

However, the vendor-private TLV prepared in the bidirectional LSP setup TLV preparing portion 21 within the message transmitter 20 is different from that of FIG. 6 showing the embodiment (1), and the traffic parameters TLV as the QoS information is added to the data field as shown in FIG. 13.

The process of the message receiver 30 upon the label request message reception at the LSR 3 is the same as that of the embodiment (1) shown in FIG. 7.

Figure 14:
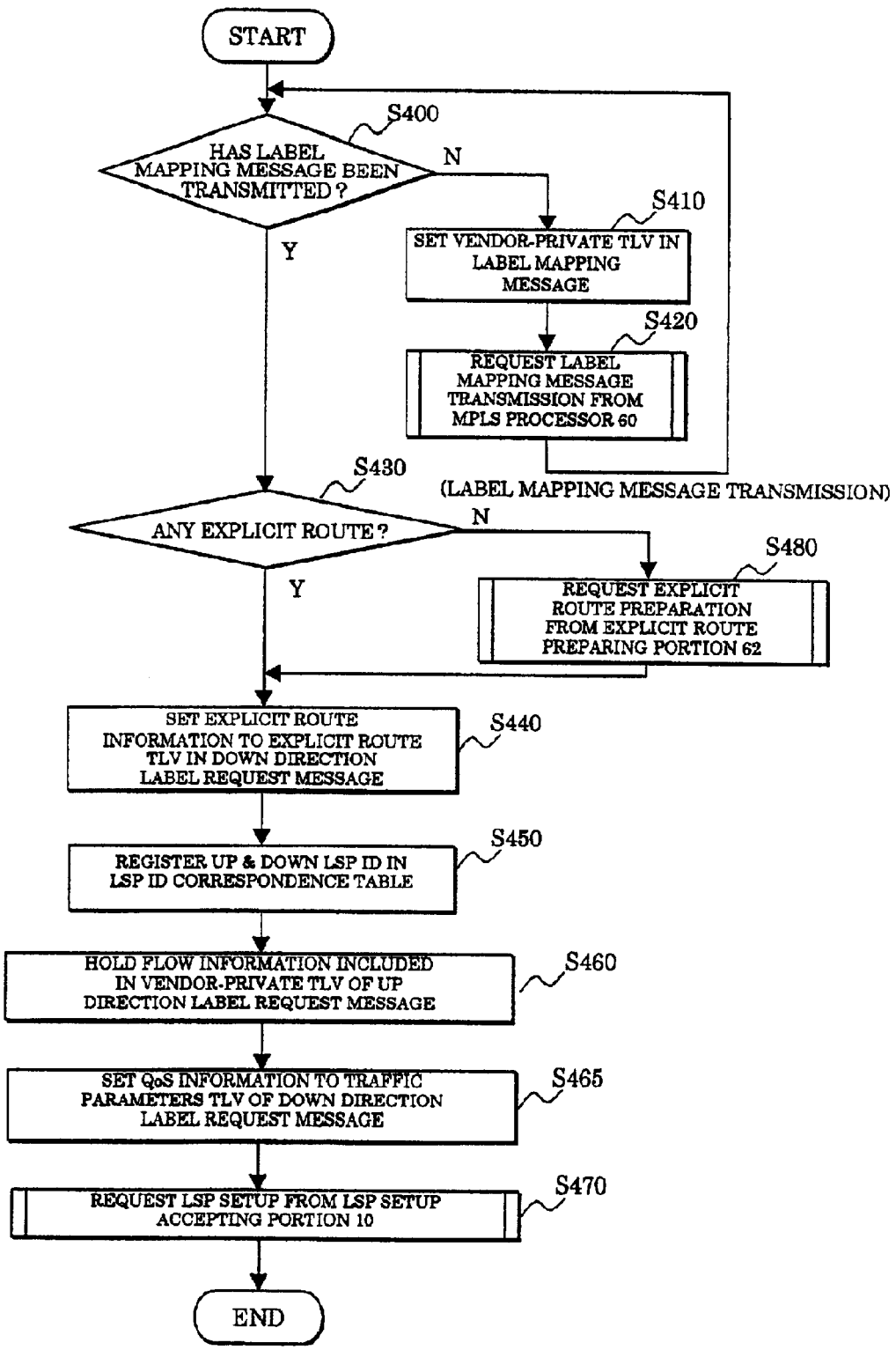
FIG. 14 is a flow chart showing a process flow (upon request of bidirectional LSP process with QoS designation) of a bidirectional LSP processor 61 in an embodiment (2) of a label switching router according to the present invention.

FIG. 14 shows a process flow of the bidirectional LSP processor 61 upon the bidirectional LSP process request with the QoS designation, in which step S465 is added between steps S460 and S470 in the embodiment (1) shown in FIG. 8.

Namely, before performing the LSP setup request to the LSP setup accepting portion 10 at step S470, the traffic parameters TLV comprising the QoS information included in the vendor-private TLV within the received label request message is read to be set in the traffic parameters TLV within the label request message transmitted to the down direction (at step S465).

Thus, the QoS designation of the down direction is made possible at the LSR 1.

Figure 15:
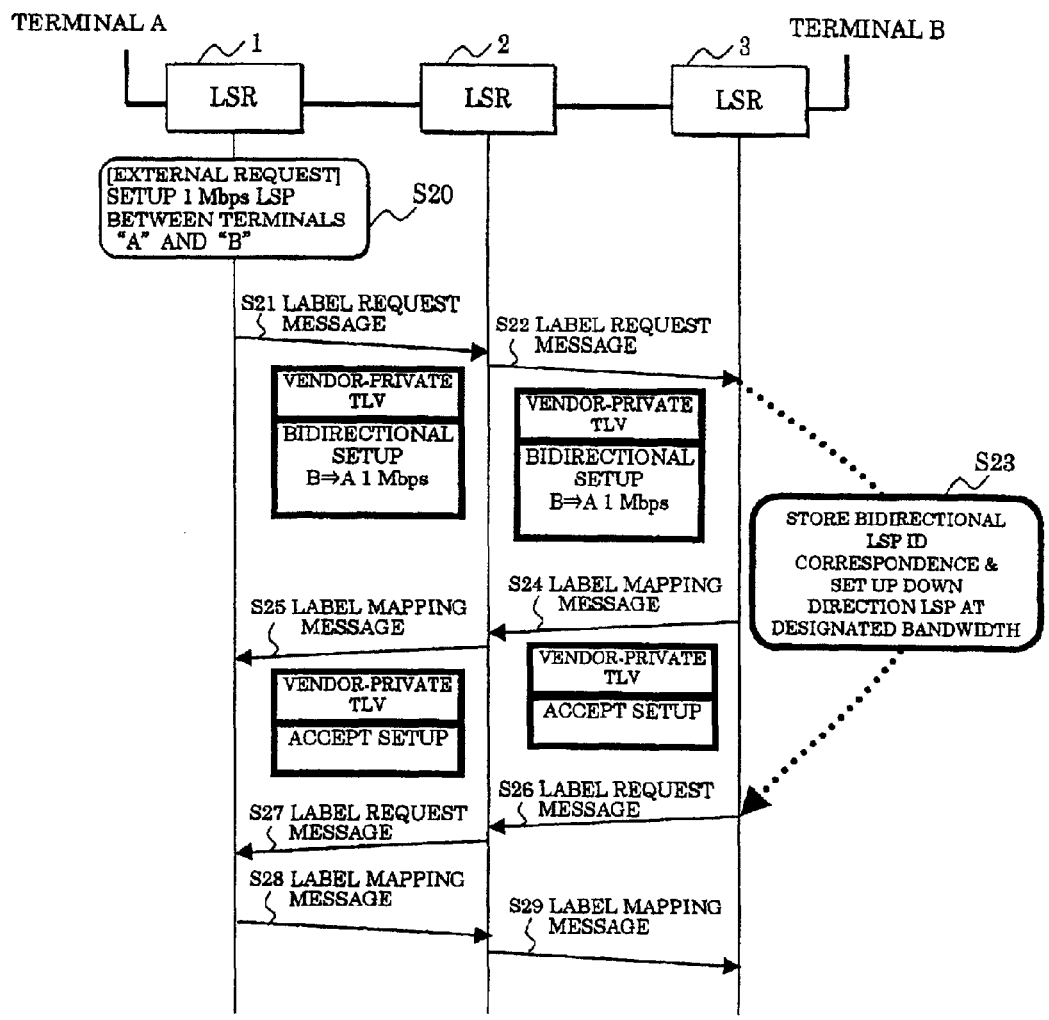
FIG. 15 is a diagram showing a message sequence of a bidirectional LSP setup in an embodiment (2) of a label switching router according to the present invention.

It is to be noted that FIG. 15 shows a sequence of the bidirectional LSP setup message in the embodiment (2). In case an external request S20 of setting up 1 Mbps LSP between the terminals "A" and "B" is made to the LSR 1, the LSR 1 transmits a label request message S21 in which the bidirectional setup and the down direction (from terminal "B" to "A") bandwidth designation of 1 Mbps are set in the vendor-private TLV to the LSR 2.

The LSR 2 which has received the message S21 transmits the label request message S22 similar to the message S21 to the LSR 3.

The LSR 3 performs the process for the bidirectional LSP setup based on the vendor-private TLV within the label request message S22. At this time, the LSR 3 stores the correspondence of the bidirectional LSP ID's and performs a down direction LSP setup S23 with the designated bandwidth (1 Mbps).

The LSR 3 transmits a label mapping message S24, to the LSR 2, which is a response to the label request message S22 in the same way as the prior art. The setup accepting information is included in the vendor-private TLV within the message S24.

Also, the LSR 3 transmits a label request message S26 required for the down direction LSP setup to the LSR 2.

When receiving the label mapping message S24 and the label request message S26, the LSR 2 transmits a label mapping message S25 and a label request message S27 respectively to the LSR 1.

The LSR 1 establishes the up direction LSP by receiving the message S25.

Also, the LSR 1 returns a label mapping message S28 to the LSR 2 in response to the label request message S27, so that the LSR 2 receives the label mapping message S28 to transmit a label mapping message S29 to the LSR 3.

The LSR 3 establishes the down direction LSP by receiving the message S29.

It is to be noted that if the bandwidth designation of 1 Mbps is removed, FIG. 15 shows a message sequence in the embodiment (1) as it is, and as obvious from the embodiments (1) and (2), the LSR 2 does not need the bidirectional LSP setup function.

Embodiment (3)

Embodiment (3) is one for designating the down direction explicit route at the entrance LSR.

Figure 16:
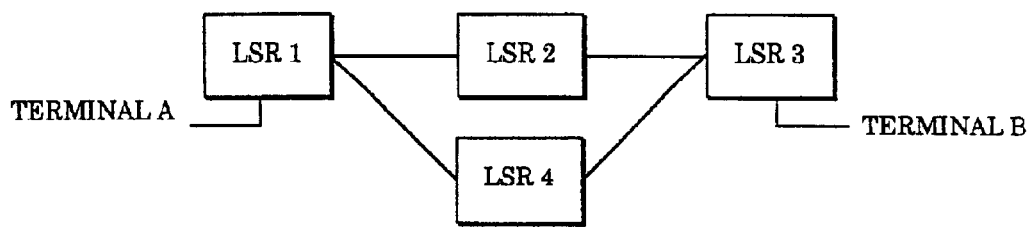
FIG. 16 is a diagram showing a network arrangement for describing an embodiment (3) of a label switching router according to the present invention.

FIG. 16 is a network arrangement (3) for describing the embodiment (3). The LSR's 1 and 3 in FIG. 16 are assumed to have the bidirectional LSP setup function of the present invention.

In case an external request for bidirectional LSP setup with the down direction explicit route designation (LSR 3→LSR 4→LSR 1) between the terminals "A" and "B" is made to the LSR 1, the process of the bidirectional LSP setup accepting portion 11 within the LSP setup accepting portion 10 is the same as that of the embodiment (1) shown in FIG. 3.

Figure 17:
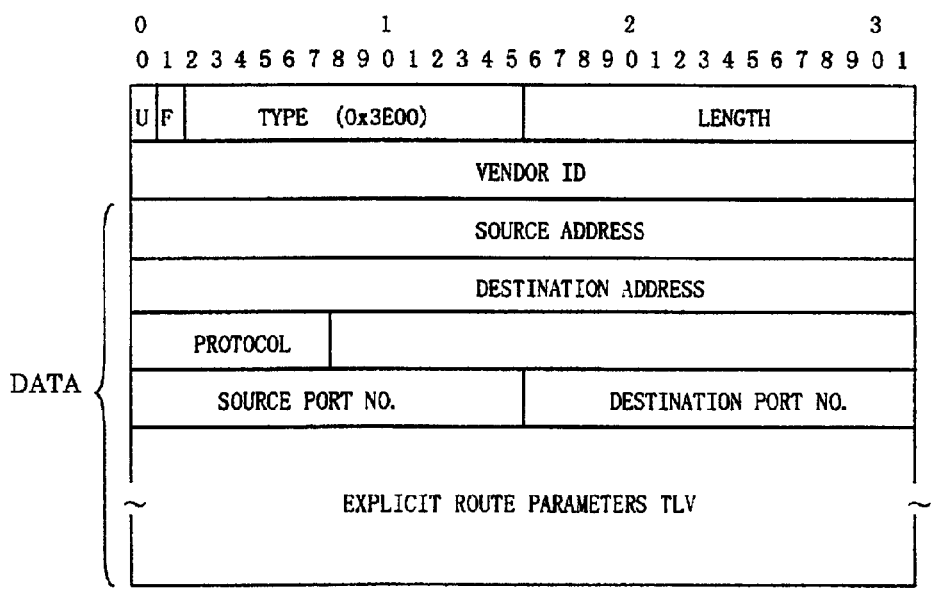
FIG. 17 is a diagram showing a format (bidirectional setup with explicit route designation) of a vendor-private TLV in an embodiment (3) of a label switching router according to the present invention.

Also, the process of the message transmitter 20 is the same as that of the embodiment (1) shown in FIG. 5. However, the vendor-private TLV prepared by the bidirectional LSP setup TLV preparing portion 21 is different from that of the embodiment (1) shown in FIG. 6, and the explicit route parameters TLV is added as the data as shown in FIG. 17.

Also, the process flows of the message receiver 30 and the bidirectional processor 61 at the LSR 3 are respectively the same as those of the embodiment (1) as shown in FIGS. 7 and 8. However, since it is determined that the explicit route exists at step S430 in FIG. 8, step S440 is executed instead of S480.

In this case, the down direction explicit route (LSR 3→LSR 4→LSR 1) included in the vendor-private TLV within the received label request message is set in the vendor-private TLV within the down direction label request message.

If the case where the label mapping message from the LSR 3 is transmitted to the LSR 1, and the up direction LSP of LSR 1→LSR 2→LSR 3 is established in the same way as the embodiment (1) is assumed, the down direction LSP passes through the LSR 4 different from the up direction LSP since there is a down direction explicit route designation in the embodiment (3).

Accordingly, the LSR 3 transmits the down direction label request message through the LSR 4. When receiving the label mapping message from the LSR 1, the LSP with the down direction explicit route designation (LSR3→LSR4→LSR1) is established.

Then, the LRS 3 sets the flow information held therein for the established down direction LSP.

Thus, although neither of the LSR 2 nor the LSR 4 has the bidirectional LSP setup function, the designation of the down direction explicit route at the LSR 1 can be performed.

Embodiment (4)

Embodiment (4) is one for changing the setup contents of the down direction LSP by the entrance LSR.

It is supposed that in the embodiment (4) the bidirectional LSP with the 1 Mbps bandwidth guarantee has already been established between the terminals "A" and "B" on the assumption of the above-mentioned embodiment (2).

It is also assumed that an external change request for 3 Mbps bandwidth guarantee for the down direction LSP is made to the LSR 1.

Figure 18:
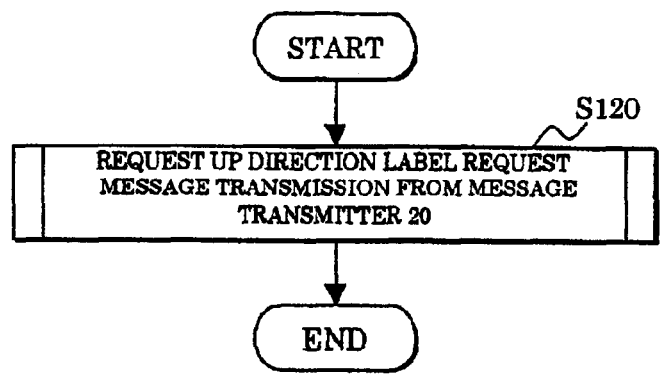
FIG. 18 is a flow chart showing a process flow (upon external request of bidirectional LSP setup change) of a bidirectional LSP setup accepting portion 11 in an embodiment (4) of a label switching router according to the present invention.

The bidirectional LSP setup accepting portion 11 within the LSP setup accepting portion 10 at the LSR 1 accepts the bidirectional LSP setup change request, and requests the message transmitter 20 to transmit the up direction label request message (at step S120 in FIG. 18).

The message transmitter 20 performs the process shown in FIG. 5. At this time, the bidirectional LSP setup TLV preparing portion 21 sets an Act flag within the label request message, prepares the vendor-private TLV within the label request message, and transmits the up direction label request message.

It is to be noted that the Act flag instructs the operation to the LSP, that is "0" means the LSP setup instructions and "1" means the LSP information change instructions.

Figure 19:
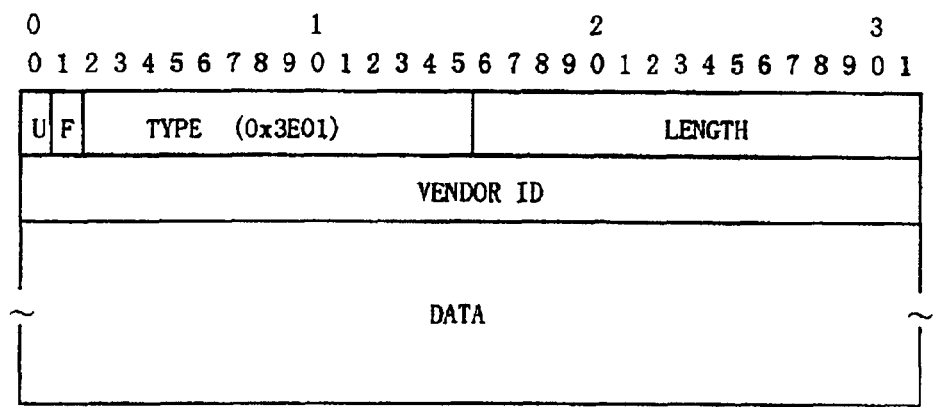
FIG. 19 is a diagram showing a format (bidirectional setup change) of a vendor-private TLV in an embodiment (4) of a label switching router according to the present invention.

FIG. 19 shows a format of the vendor-private TLV in case of the bidirectional setup change, in which "0x3E01" indicating the bidirectional setup change is set as a type, and the change information is set as data.

The process of the message receiver 30 upon the label request message reception at the LSR 3 is the same as that of the embodiment (1) shown in FIG. 7.

Figure 20:
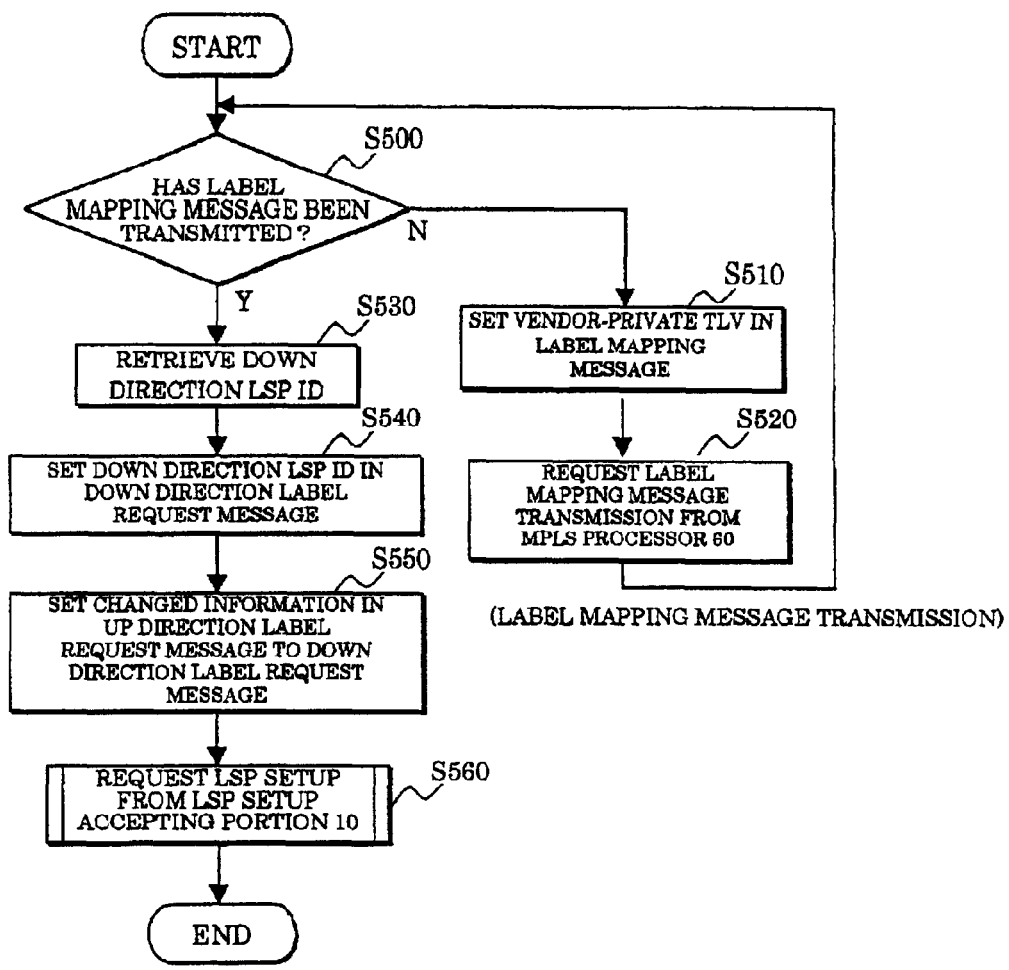
FIG. 20 is a flow chart showing a process flow (upon request of bidirectional LSP process with change designation) of a bidirectional LSP processor 61 in an embodiment (4) of a label switching router according to the present invention.

FIG. 20 shows a process flow of the bidirectional LSP processor 61 upon the bidirectional LSP process request with the change designation. Since the down direction LSP has already been established in this case, the processes of steps S500–S520 are the same as those of steps S400–S420 shown in FIG. 8. However, the process in the case where it is determined that the label mapping message has already been transmitted at step S500 is different from that of FIG. 8.

Namely, the bidirectional LSP processor 61 retrieves the LSP ID correspondence table shown in FIG. 11 by the LSP ID within the up direction label request message, and leads the down direction LSP ID (at step S530) to be set in the down direction label request message (at step S540). At this time, the Act flag is set in the label request message.

Furthermore, the change information (3 Mbps bandwidth guarantee) included in the vendor-private TLV within the received label request message is read to be set in the traffic parameters TLV within the down direction label request message (at step S550). Then, the LSP setup change is requested from the LSP setup accepting portion 10 (at step S560).

The LSP setup accepting portion 10 transmits the down direction label request message by the same process as the prior art, and receives the label mapping message from the LSR 1, so that the setup information of the down direction LSP is changed to the 3 Mbps bandwidth guarantee.

Thus, it becomes possible for the entrance LSR to change the setup contents of the down direction LSP.

Figure 21:
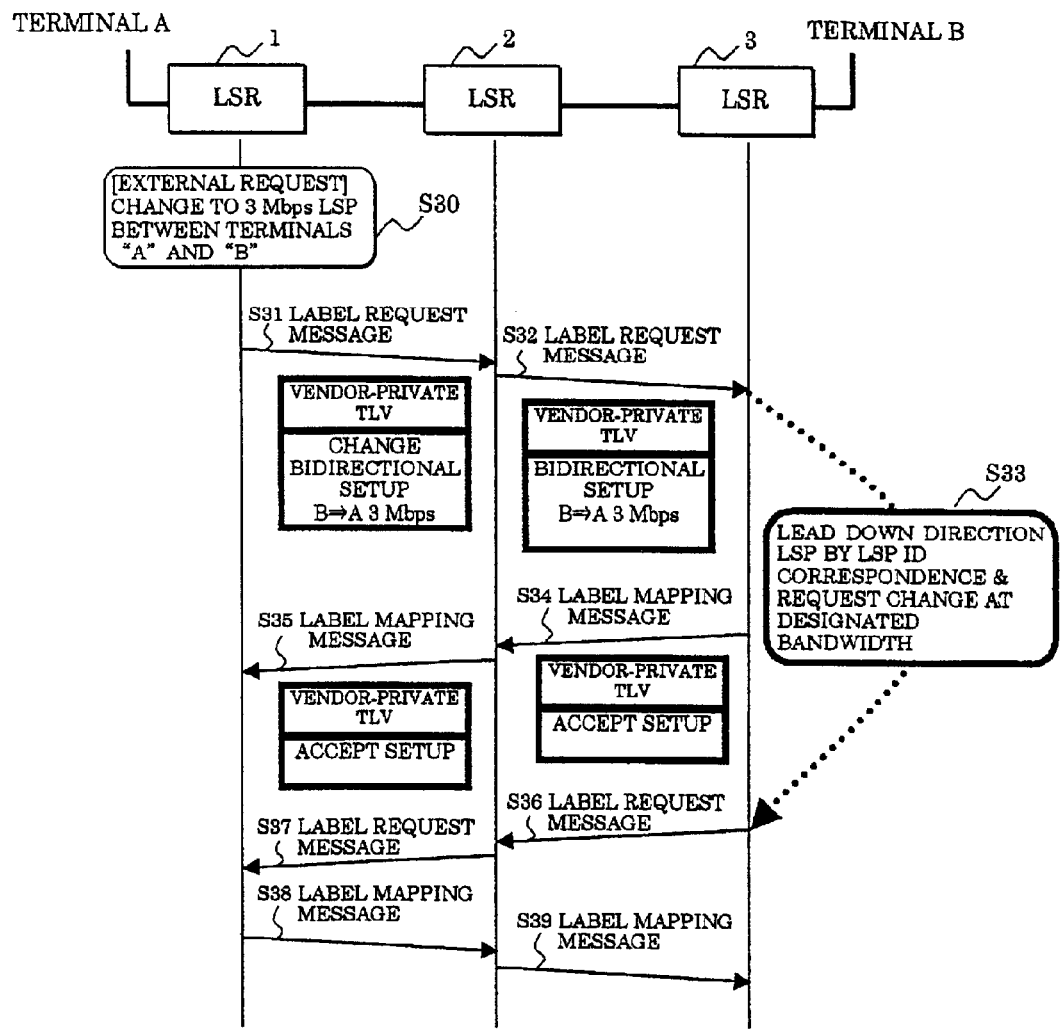
FIG. 21 is a diagram showing a massage sequence of a bidirectional LSP setup in an embodiment (4) of a label switching router according to the present invention.

FIG. 21 shows a message sequence upon the setup change. In case an external request S30 for changing the LSP between the terminals "A" and "B" to 3 Mbps is made, the LSR 1 transmits, to the LSR 2, a label request message S31 within which the information for changing the down direction bandwidth guarantee to 3 Mbps is set in the vendor-private TLV.

Hereafter, the bidirectional bandwidth guarantee is changed to 3 Mbps by the same message sequence as that of FIG. 15.

However, since the bidirectional LSP has already been established when the LSR 3 receives a label request message S32, different from the case of FIG. 15, the LSR 3 leads the down direction LSP by retrieving the LSP ID correspondence table, so that a setup change request S33 to a designated bandwidth is provided to the down direction LSP.

Embodiment (5)

Embodiment (5) is one for designating the down direction LSP deletion at the entrance LSR 1 on the assumption that the bidirectional LSP has already been established for LSR 1-LSR 2-LSR 3 between the terminals "A" and "B" shown in FIGS. 2 and 12 by the embodiments (1), (2), and (4).

Figure 22:
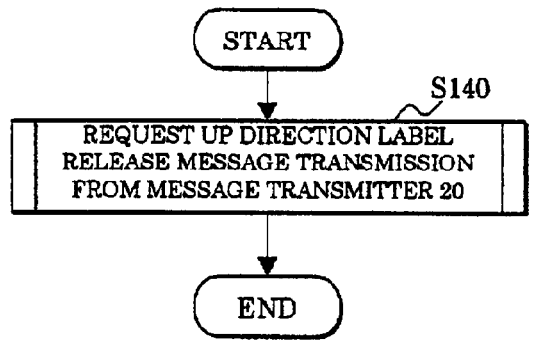
FIG. 22 is a flow chart showing a process flow (upon external request of bidirectional LSP deletion) of a bidirectional LSP setup accepting portion 11 in an embodiment (5) of a label switching router according to the present invention.

FIG. 22 shows a process flow in the bidirectional LSP setup accepting portion 11 within the LSP setup accepting portion 10 in case an external request for the bidirectional LSP deletion is made to the LSR 1. When accepting the bidirectional LSP setup request, the bidirectional LSP setup accepting portion 11 requests the message transmitter 20 to transmit the up direction label release message (at step S140).

Figure 23:
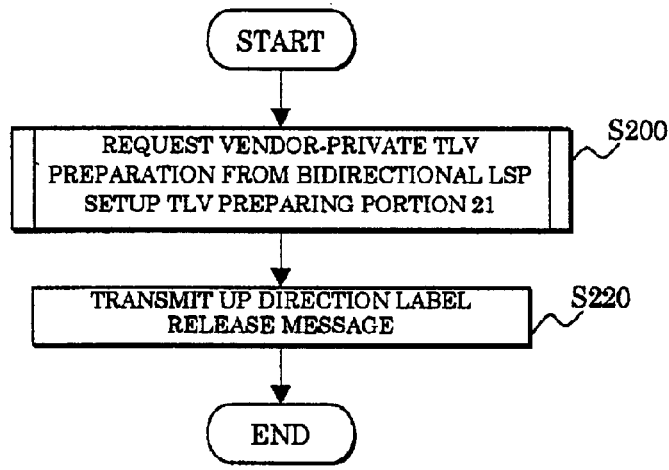
FIG. 23 is a flow chart showing a process flow (upon request of up direction label release message transmission) of a message transmitter 20 in an embodiment (5) of a label switching router according to the present invention.

FIG. 23 shows a process flow of the message transmitter 20. The message transmitter 20 requests the preparation of the vendor-private TLV to be included in the label release message from the bidirectional LSP setup TLV preparing portion 21 (at step S200).

Then, the message transmitter 20 transmits the up direction label release message included in the prepared vendor private TLV (at step S220).

Figure 24:
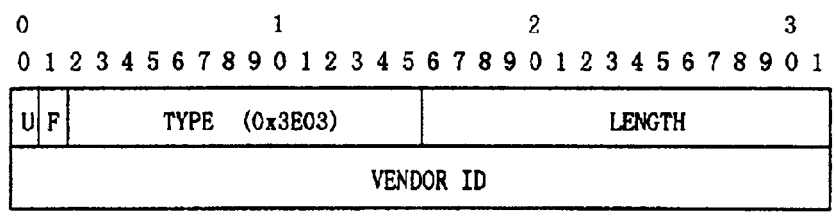
FIG. 24 is a diagram showing a format (bidirectional deletion) of a vendor-private TLV in an embodiment (5) of a label switching router according to the present invention.

It is to be noted that at step S200, the type "0x3E03" indicating the bidirectional deletion as shown in FIG. 24 is set in the vendor-private TLV, prepared by the bidirectional LSP setup TLV preparing portion 21, for the bidirectional deletion. Also, the data are not set in the vendor-private TLV.

Figure 25:
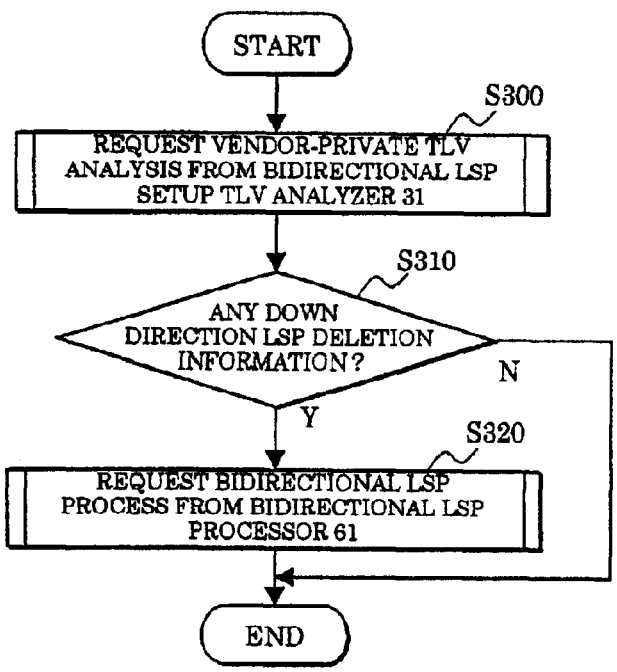
FIG. 25 is a flow chart showing a process flow (upon reception of up direction label release message) of a message receiver 30 in an embodiment (5) of a label switching router according to the present invention.

When receiving the label release message, the LSR 3 deletes the up direction LSP in the same way as the prior art process in the MPLS processor 60, and the message receiver 30 performs the process shown in FIG. 25.

Firstly, the message receiver 30 requests the analysis of the vendor-private TLV within the label release message from the internal bidirectional LSP setup TLV analyzer 31 (at step S300). Based on the analyzed result, the presence/absence of the down direction LSP deletion information is determined (at step S310). In the absence of the down direction LSP deletion information, the process is ended. Otherwise the bidirectional LSP process is requested from the bidirectional LSP processor 61 (at step S320).

Figure 26:
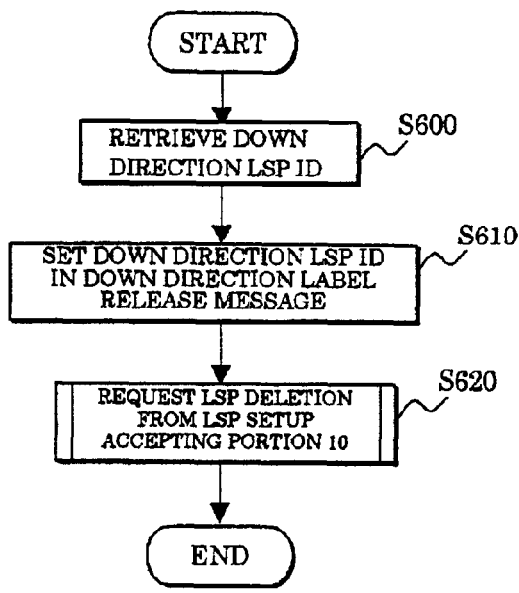
FIG. 26 is a flow chart showing a process flow (upon reception of label release message) of a bidirectional LSP processor 61 in an embodiment (5) of a label switching router according to the present invention.

FIG. 26 shows a process flow of the bidirectional LSP processor 61 upon the label release message reception. The bidirectional LSP processor 61 retrieves the down direction LSP ID from the LSP ID correspondence table by the LSP ID set in the label release message (at step S600), so that the down direction LSP ID is set in the down direction label release message (at step S610).

Then, the bidirectional LSP processor 61 requests the LSP deletion from the LSP setup accepting portion 10 (at step S620).

Thus, by the same process as the prior art by the LSP setup accepting portion 10 and the message transmitter 20, the down direction label release message is transmitted, so that the down direction LSP is deleted.

Thus, it becomes possible for the entrance LSR to request the deletion of the down direction LSP.

Figure 27:
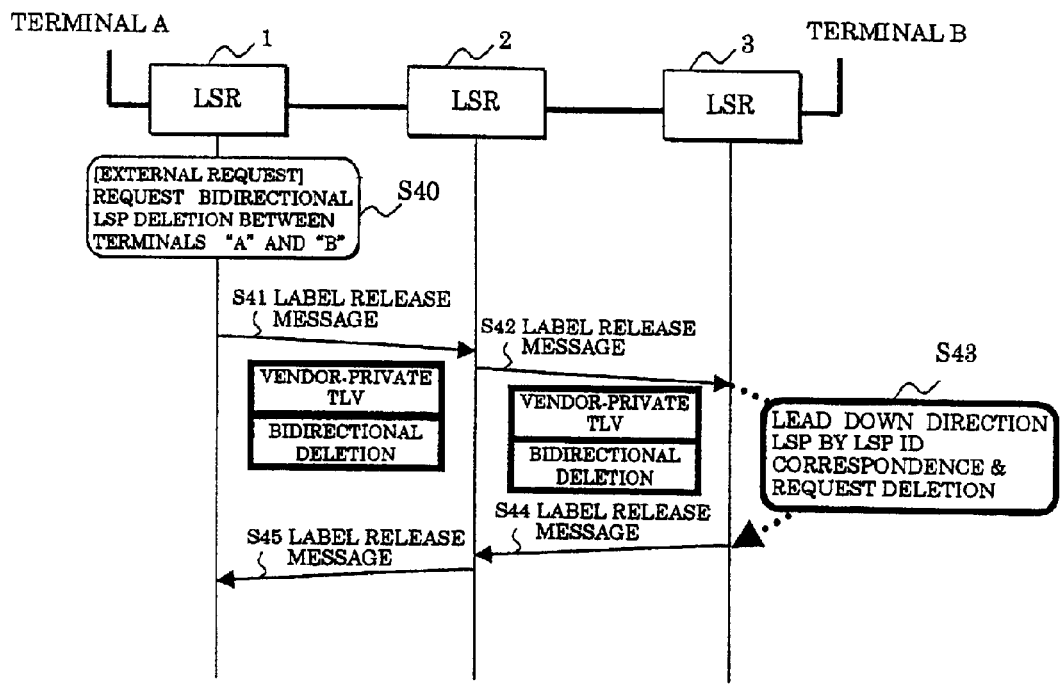
FIG. 27 is a diagram showing a massage sequence of a bidirectional LSP deletion in an embodiment (5) of a label switching router according to the present invention.
Figure 28:
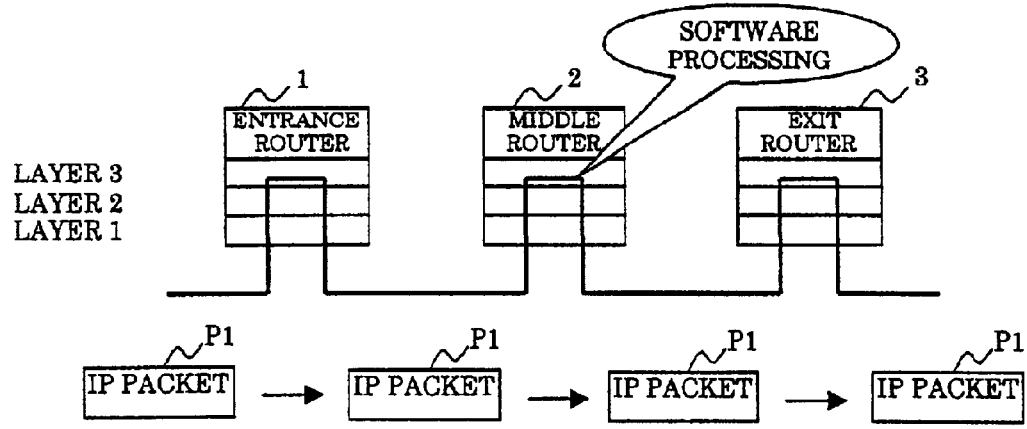
FIG. 28 is a diagram for illustrating a packet relay by a prior art router.
Figure 29:
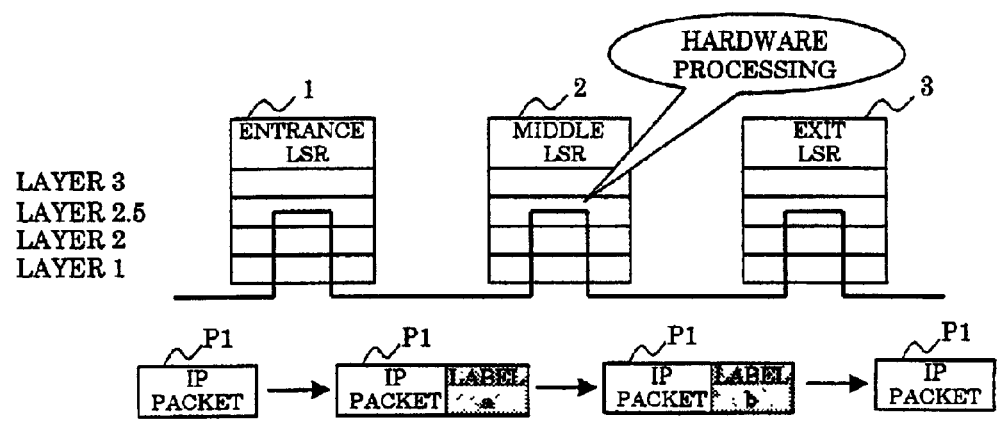
FIG. 29 is a diagram for illustrating a packet relay by a general router corresponding to MPLS.
Figure 30:
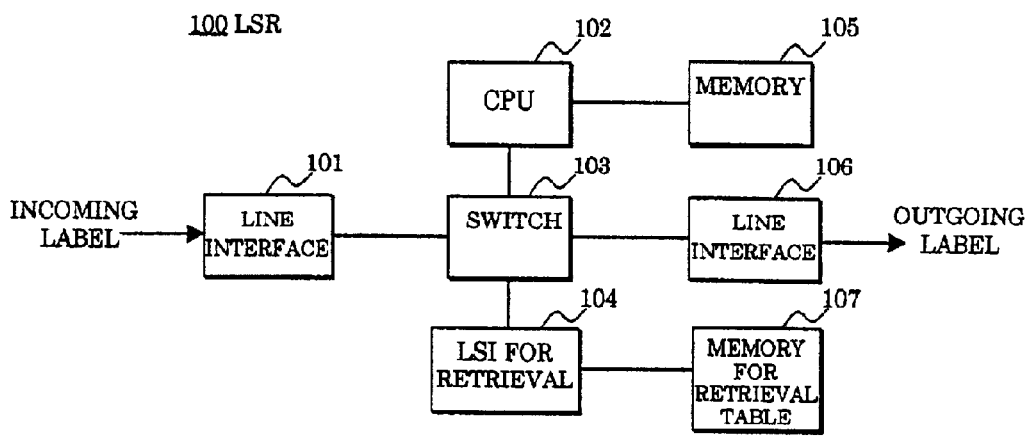
FIG. 30 is a block diagram showing an arrangement of a general LSR.
Figure 31:
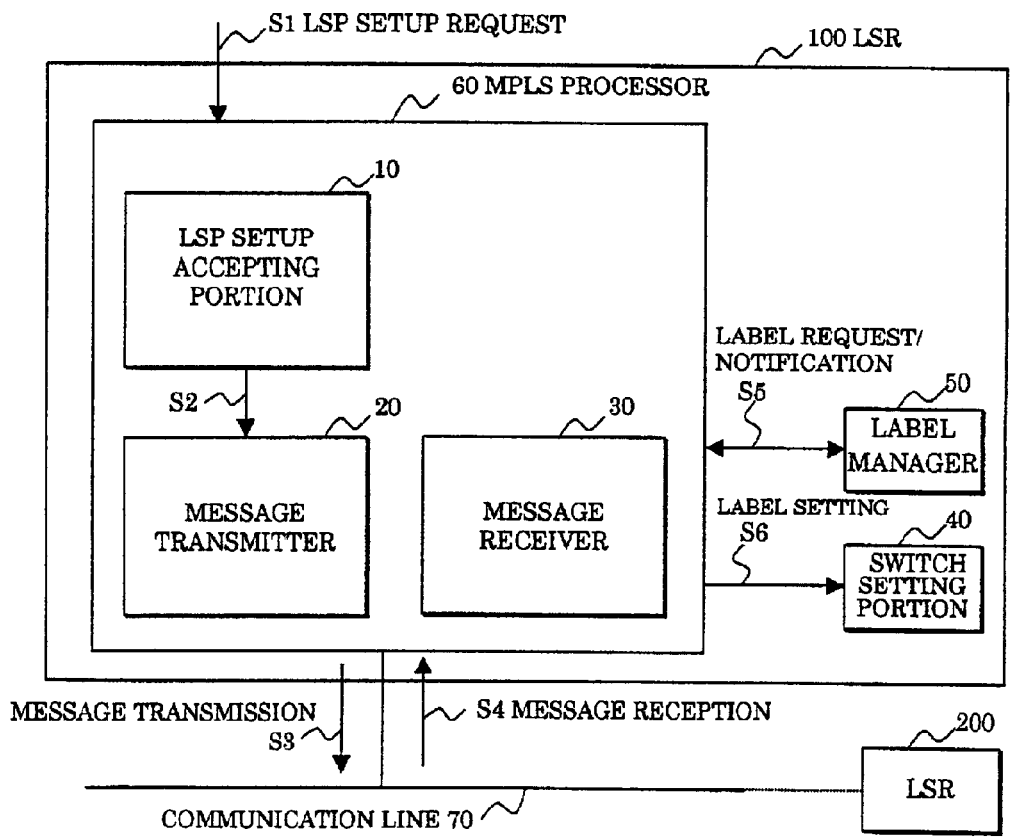
FIG. 31 is a block diagram showing an LSP setup process by a prior art LSR.
Figure 32:
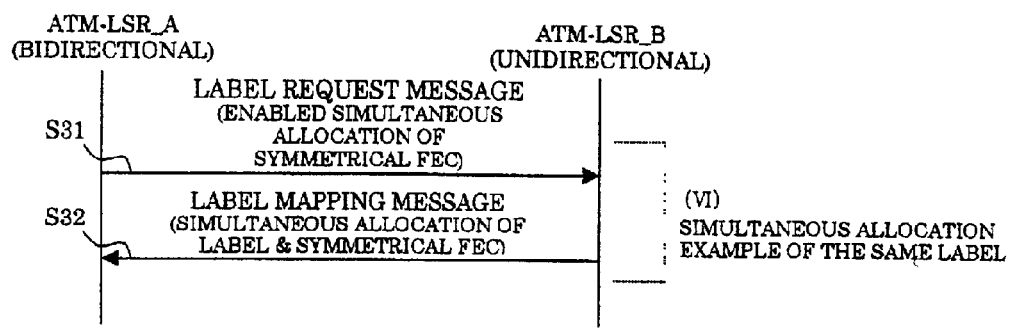
FIG. 32 is a sequence diagram for illustrating a simultaneous allocation example of a same label in a PAA apparatus.

FIG. 27 shows a message sequence of the bidirectional LSP deletion. When receiving an external request S40 of the bidirectional LSP deletion between the terminals "A" and "B", the LSR 1 transmits a label release message S41, to the LSR 2, including the vendor-private TLV in which the bidirectional deletion is set.

The LSR 2 transfers a label release message S42, to the LSR 3, including the vendor-private TLV in which the bidirectional deletion is set likewise. The LSR 3 receives the message S42, thereby deleting the up direction LSP.

The LSR 3 retrieves the LSP ID correspondence table, leads the down direction LSP, and performs the deletion request. In this case, the LSR 3 transmits a label release message S44 to the LSR 2. Also, the LSR 2 which has received the message S44 transmits a label release message S45 to the LSR 1.

The LSR 1 receives the message S45, thereby deleting the down direction LSP. Thus, the bidirectional LSP deletion is completed.

Embodiment (6)

Embodiment (6) is one for storing the presence/absence of the bidirectional LSP setup function of the exit LSR at the entrance LSR, thereby avoiding the repetition of the failure of the bidirectional LSP setup.

For example, the case where only the LSR1 has the bidirectional LSP setup function of the present invention in the network arrangement (2) shown in FIG. 12 is now assumed.

When receiving the up direction label request message from the LSR 1 in the same way as the embodiment (1), the LSR 3 transmits the label mapping message in the same way as the prior art process thereby establishing the up direction LSP.

However, since the LSR 3 is not provided with the bidirectional LSP setup function, the vendor-private TLV for setup acceptance as shown in FIG. 9 is not included in the label mapping message transmitted by the LSR 3, different from the case of the embodiment (1).

When receiving the label mapping message from the LSR 3, the LSR 1 recognizes that the setup accepting information is not set in the vendor-private TLV within the label mapping message at the bidirectional LSP setup TLV analyzer 31 within the message receiver 30.

Also, the message receiver 30 notifies that the LSR 3 does not have the bidirectional LSP setup function to the bidirectional LSP processor 61. The bidirectional LSP processor 61 registers the LSR 3 in the table for the LSR without bidirectional LSP setup function shown in FIG. 4.

Then, in case an external request of setting up the bidirectional LSP is made to LSR 1-LSR 2-LSR 3 between the terminals "A" and "B" from the LSR 1 again, the bidirectional LSP setup accepting portion 11 accepts the bidirectional LSP setup request, and inquires of the bidirectional LSP processor 61 the presence/absence of the bidirectional LSP setup function at the LSR 3 at step S100 in FIG. 3.

At this time, the bidirectional LSP processor 61 recognizes that the LSR 3 is registered in the table for LSR without the bidirectional LSP setup function, and notifies that the LSR 3 lacks the bidirectional LSP setup function to the bidirectional LSP setup accepting portion 11.

The bidirectional LSP setup accepting portion 11 which has received the notification notifies that the bidirectional LSP setup is disabled to the outside (at step S130).

Thus, by recognizing that an LSR does not have the bidirectional LSP setup function, it becomes possible to discard the request in case the bidirectional LSP setup request occurs again at the same LSR.

As described above, a label switching router according to the present invention is arranged such that a bidirectional LSP setup TLV preparing portion prepares a bidirectional LSP setup TLV included in a bidirectional setup label request message transmitted in an up direction to a label switching router placed at one end of the LSP based on an external bidirectional LSP setup request accepted by a bidirectional LSP setup accepting portion, a bidirectional LSP setup TLV analyzer analyzes the bidirectional LSP setup TLV in the message when the message is received from the label switching router at the other end, a bidirectional LSP processor performs an LSP setup request in a down direction as opposed to the up direction based on the analyzed result by the bidirectional LSP setup TLV analyzer, and an explicit route preparing portion prepares an explicit route on which a router to be relayed in the down direction is prescribed, based on an explicit route preparing request from the bidirectional LSP processor and notifies the prepared route to the bidirectional LSP processor. Therefore, a pair of bidirectional LSP's can be established with a single operation regardless of the function of other label switching routers existing on the LSP path.

What we claim is:

1. A label switching router placed at an end of an LSP set by using CRLDP comprising:

a bidirectional LSP setup accepting portion for accepting an external bidirectional LSP setup request, a bidirectional LSP setup TLV preparing portion for preparing a bidirectional LSP setup TLV included in a bidirectional setup label request message transmitted in an up direction to a label switching router placed at another end of the LSP based on the bidirectional LSP setup request, a bidirectional LSP setup TLV analyzer for analyzing the bidirectional LSP setup TLV in the message when the message is received from the label switching router at the other end, a bidirectional LSP processor for performing an LSP setup request in a down direction as opposed to the up direction based on the analyzed result by the bidirectional LSP setup TLV analyzer, and an explicit route preparing portion for preparing an explicit route on which a router to be relayed in the down direction is prescribed, based on an explicit route preparing request from the bidirectional LSP processor, based on the CRLDP, and for notifying the prepared route to the bidirectional LSP processor.

2. The label switching router as claimed in claim 1 wherein the bidirectional LSP setup TLV preparing portion includes down direction service quality information in the bidirectional LSP setup TLV.

3. The label switching router as claimed in claim 1 wherein the bidirectional LSP setup TLV preparing portion includes down direction explicit route information in the bidirectional LSP setup TLV.

4. The label switching router as claimed in claim 1 wherein the bidirectional LSP setup TLV preparing portion sets bidirectional LSP setup information in the label request message transmitted upon an LSP information change request in the up direction.

5. The label switching router as claimed in claim 1 wherein the bidirectional LSP setup TLV preparing portion sets bidirectional LSP deletion information in a label release message transmitted upon an LSP deletion request in the up direction.

6. The label switching router as claimed in claim 1 wherein when the bidirectional LSP setup TLV analyzer finds, as a result of analyzing a label mapping message received in response to the label request message, that bidirectional LSP request accepting information indicating that the bidirectional LSP setup request is accepted at the label switching router placed at the other end is not set in the label mapping message, the bidirectional LSP processor recognizes that the label switching router at the other end does not have a bidirectional LSP setup function.

7. The label switching router as claimed in claim 1 wherein the bidirectional LSP setup TLV comprises a vendor-private TLV.

* * * * *